(12) United States Patent  
Girschick

(10) Patent No.: US 8,538,637 B2
(45) Date of Patent: Sep. 17, 2013

(54) VEHICLE WITH A LUGGAGE COMPARTMENT AND AN OPERATING ELEMENT

(75) Inventor: Robert Girschick, Gross-Umstadt (DE)

(73) Assignee: GM Global Technology Operations LLC, Detroit, MI (US)

(*) Notice: Subject to any disclaimer, the term of this patent is extended or adjusted under 35 U.S.C. 154(b) by 828 days.

(21) Appl. No.: 12/293,886

(22) PCT Filed: Mar. 16, 2007

(86) PCT No.: PCT/EP2007/052521
§ 371 (c)(1),
(2), (4) Date: Jul. 31, 2009

(87) PCT Pub. No.: WO2007/107518
PCT Pub. Date: Sep. 27, 2007

(65) Prior Publication Data
US 2009/0306862 A1    Dec. 10, 2009

(30) Foreign Application Priority Data

Mar. 22, 2006   (DE) .......................... 10 2006 013 064

(51) Int. Cl.
*B60R 22/00* (2006.01)
*E05F 15/00* (2006.01)
*G05D 1/00* (2006.01)
*G05D 3/00* (2006.01)
*G06F 7/00* (2006.01)
*G06F 17/00* (2006.01)

(52) U.S. Cl.
USPC ............... 701/49; 701/1; 701/36; 280/1.196; 280/124.101; 190/19; 190/29; 190/30; 296/182.1; 296/76; 296/37.1

(58) Field of Classification Search
USPC ............... 701/49, 1, 36; 296/182.1, 186.4, 296/193.02, 37.1; 280/1.167, 1.196, 1.204, 280/124.101, 417.1, 901; 190/1, 15.1, 19, 190/29, 30
See application file for complete search history.

(56) References Cited

U.S. PATENT DOCUMENTS 4,573,854 A * 3/1986 McFarland .................. 414/462
4,616,972 A * 10/1986 McFarland ................ 414/749.1

(Continued)

FOREIGN PATENT DOCUMENTS

DE   4017421   12/1990
DE   4418681   11/1995

(Continued)

OTHER PUBLICATIONS

ISA—European Patent Office, International Search Report for Application No. PCT/EP2007/052521, dated Oct. 1, 2007.

(Continued)

*Primary Examiner* — Jack W Keith
*Assistant Examiner* — Rami Khatib
(74) *Attorney, Agent, or Firm* — Ingrassia Fisher & Lorenz, P.C.

(57) ABSTRACT

In a vehicle that features a luggage compartment with a cargo opening that can be closed, as well as an operating element that can be actuated in order to open the luggage compartment, an auxiliary function is provided for a function other than the function of opening the luggage compartment and assigned to the operating element while the cargo opening is open such that no additional operating elements.

20 Claims, 2 Drawing Sheets

(56) References Cited

U.S. PATENT DOCUMENTS

| | | | | |
|---|---|---|---|---|
| 4,685,860 | A * | 8/1987 | McFarland | 414/720 |
| 5,031,949 | A * | 7/1991 | Sorimachi et al. | 296/76 |
| 5,072,965 | A | 12/1991 | Wada et al. | |
| 5,765,987 | A * | 6/1998 | Zimmermann | 414/800 |
| 6,095,589 | A * | 8/2000 | Kinnanen et al. | 296/107.09 |
| 6,142,555 | A * | 11/2000 | Huber | 296/107.17 |
| 6,350,049 | B1 * | 2/2002 | Zimmermann et al. | 362/496 |
| 6,561,489 | B1 * | 5/2003 | Wakefield | 254/323 |
| 2002/0135200 | A1 * | 9/2002 | De Gaillard | 296/107.01 |
| 2003/0071479 | A1 * | 4/2003 | Schaller et al. | 296/136 |
| 2003/0197396 | A1 * | 10/2003 | Eichholz et al. | 296/108 |
| 2003/0231131 | A1 * | 12/2003 | Dimig et al. | 341/176 |
| 2005/0002768 | A1 | 1/2005 | Nick et al. | |
| 2007/0150143 | A1 | 6/2007 | Stiller et al. | |
| 2007/0194591 | A1 * | 8/2007 | Kielmann et al. | 296/76 |

FOREIGN PATENT DOCUMENTS

| | | |
|---|---|---|
| DE | 19627076 C1 | 9/1997 |
| DE | 29817837 U1 | 2/2000 |
| DE | 19925006 A1 | 12/2000 |
| DE | 19926651 C1 | 12/2000 |
| DE | 10054220 A1 | 8/2001 |
| DE | 10011988 C1 | 10/2001 |
| DE | 20220177 U1 | 3/2003 |
| DE | 10155836 A1 | 6/2003 |
| DE | 10208994 A1 | 9/2003 |
| DE | 10223041 A1 | 12/2003 |
| DE | 69818970 T2 | 7/2004 |
| DE | 102004002973 | 8/2005 |
| DE | 102004014329 | 10/2005 |
| DE | 102004035425 A1 | 3/2006 |
| DE | 102005045300 A1 | 9/2006 |
| EP | 0938994 | 9/1999 |
| FR | 2860538 | 4/2005 |
| JP | 57186541 A | 11/1982 |

OTHER PUBLICATIONS

German Patent Office, German Search Report for Application No. 102006013064.2, dated Jun. 11, 2008.

* cited by examiner

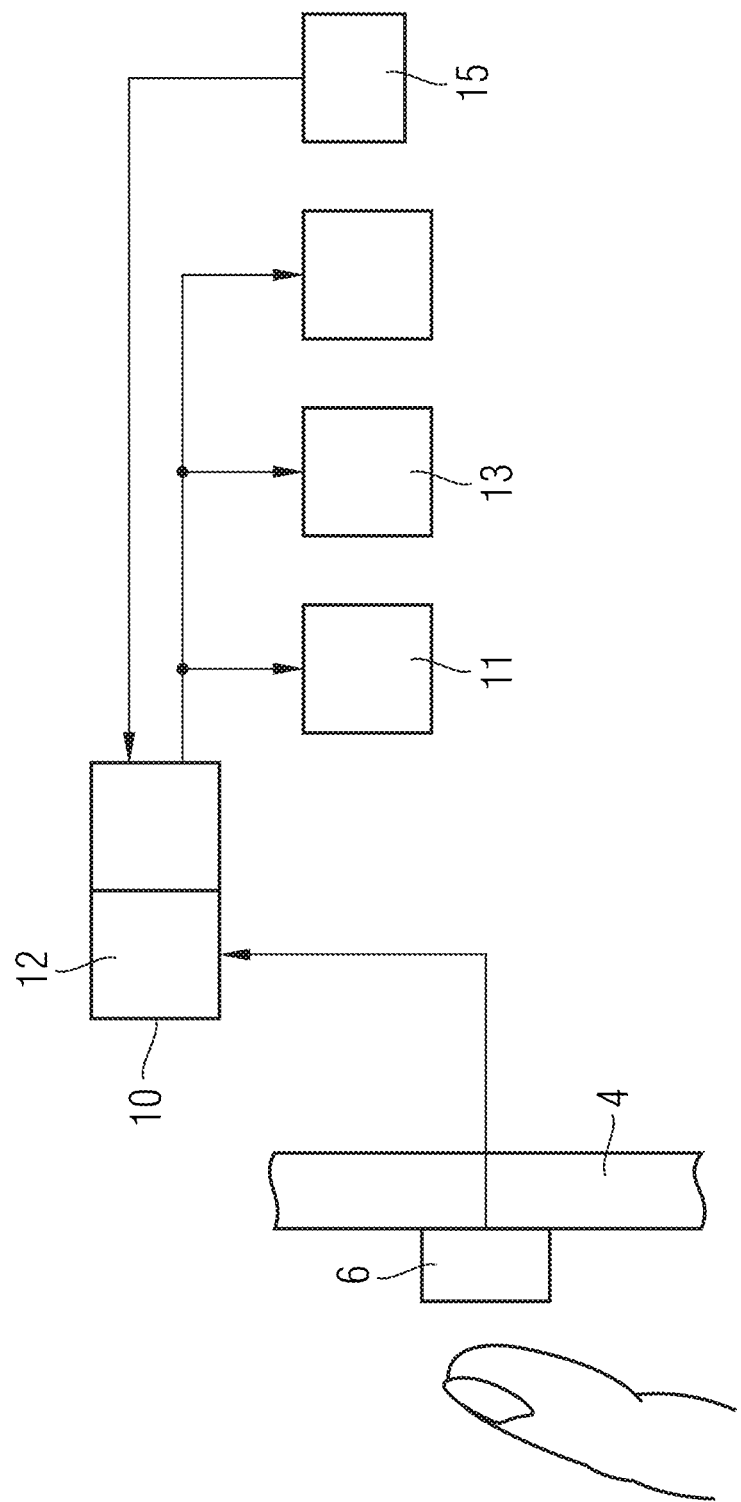

VEHICLE WITH A LUGGAGE COMPARTMENT AND AN OPERATING ELEMENT

CROSS-REFERENCE TO RELATED APPLICATIONS

This application is a U.S. National-Stage entry under 35 U.S.C. §371 based on International Application No. PCT/EP2007002419, filed Mar. 19, 2007, which was published under PCT Article 21(2) and which claims priority to German Application No. 102006013065.0, filed Mar. 22, 2006, which are all hereby incorporated in their entirety by reference.

TECHNICAL FIELD

The technical field relates to a vehicle, particularly a motor vehicle with a luggage compartment.

BACKGROUND

Depending on the position of the driving engine, either the front or the rear of vehicles usually features a luggage compartment that can be closed with a lid and serves for storing pieces of luggage and, if applicable, for accommodating a spare tire. In most vehicles, the luggage compartment is arranged on the rear side and accordingly can be closed with a rear lid.

In order to open the rear lid, it traditionally features a locking mechanism that in the past was operated by means of a lock actuated with a key. In more modern vehicles, this function is also realized with touch contacts or contact switches that can only be switched when the vehicle doors are unlocked such that the rear lid cannot be opened by strangers while the vehicle is parked. Such a rear lid can frequently also be opened by means of a remote control element.

The rear lid is usually opened in order to load or unload the vehicle. This frequently requires other activities such as, for example, switching on a luggage compartment light if this is not realized automatically, folding over a back seat or the like.

For example, in vehicles that are realized in the form of convertible vehicles, particularly vehicles with a retractable hard top, this hard top or part of the roof can be retracted into the luggage compartment. This means that a large portion of the luggage compartment is occupied, wherein a cargo area that is realized separately of the luggage compartment and can be loaded with pieces of luggage is usually reserved and also kept clear when the roof is retracted. Convertible vehicles with retractable roofs already are generally known from German utility model DE 298 17 837 U1.

According to DE 69 818 970 T2, for example, the particular problem arising in such instances can be seen in that the retracted roof interferes with the loading of the cargo area. Such vehicles are therefore provided with a device for temporarily raising the roof by a short distance such that the loading of the cargo area can be respectively realized or simplified. In order to actuate the device for raising the roof, an additional switch is provided and integrated into the corresponding lock that can be actuated by means of a key. Although this device is quite convenient, it requires a complicated lock with several separate switches.

The present invention therefore is based on at least one objective of easily realizing a sensible and convenient initiation of other functions of a motor vehicle of the initially cited type that features a cargo opening that can be closed, as well as an operating element that can be actuated in order to open the luggage compartment. In addition, other objectives, desirable features, and characteristics will become apparent from the subsequent summary and detailed description and the appended claims, taken in conjunction with the accompanying drawings and this background.

SUMMARY

According to an embodiment of the invention, this at least one objective, other objectives, desirable features and characteristics, are attained in that an auxiliary function other than the function of opening the luggage compartment is assigned to the operating element while the cargo opening is open.

For example, the auxiliary function can be assigned to the operating element by means of an electronic circuit during the first actuation of the operating element for opening the luggage compartment or by means of a sensor device that monitors the opening status of the luggage compartment. At the same time, the operating element temporarily surrenders its original function of opening the luggage compartment. This means that only a single switch is required. When the luggage compartment is closed again, the function of opening the luggage compartment is automatically reassigned to the operating element. For example, the operating element may be realized in the form of a lock that can be actuated by means of a key, wherein an electric switch is switched during the actuation of the lock. The lock only requires a single switch, the first actuation of which merely causes the closed luggage compartment to be opened and the subsequent second actuation of which initiates the auxiliary function.

It is particularly advantageous that the auxiliary function is a function that is predominantly or exclusively needed while the cargo opening is open. The auxiliary function may concern, for example, the control of a vehicle illumination. This means that, for example, the parking lights of a vehicle or its hazard warning light system can be manually switched on or off by means of the operating element while the luggage compartment is open.

It appears particularly sensible that the auxiliary function concerns the control of the luggage compartment illumination, wherein the luggage compartment illumination can be switched on or an auxiliary luggage compartment illumination can also be switched on by actuating the operating element. It would also be possible to dim the luggage compartment illumination by means of the operating element. When the luggage compartment is closed, the auxiliary function is canceled again (i.e., the luggage compartment illumination is switched off).

An embodiment of the invention can be realized in a particularly advantageous fashion if the auxiliary function concerns the actuation of a loading implement. This implement is provided in order to realize a more favorable constellation for loading and unloading the vehicle.

This can be achieved, for example, by realizing the loading implement in the form of a device for lowering and raising the cargo area of the luggage compartment. In this case, the vehicle can be realized such that its rear side can be lowered or raised by means of a hydraulic or pneumatic system. The corresponding hydraulic or pneumatic system can then be actuated as part of the auxiliary function by means of the operating element. When the luggage compartment is open, for example, the actuation of the operating element causes the cargo area to be lowered, wherein the cargo area is then automatically raised again when the luggage compartment is closed. This simplifies the loading of the vehicle with heavy objects.

It is particularly advantageous that the loading implement may also consist of a device for unlocking a spare tire stored in the luggage compartment. This can significantly simplify the removal of the spare tire from the luggage compartment in case of a tire failure.

One or more embodiments of the invention may also be advantageously realized in such a way that the loading implement unlocks a folding back seat. In this case, the actuation of the operating element automatically unlocks the back seat such that it can be easily folded down from the luggage compartment in order to increase the size thereof.

It is also advantageous that the loading implement may consist of a device for moving a roof or roof section of the vehicle that is at least partially situated in the luggage compartment.

This function can be considered in convertible vehicles, in which the soft top or the retractable hard top is at least partially accommodated in the luggage compartment. This roof or roof section at least partially covers the remaining cargo area of the luggage compartment, wherein a device for moving the roof or roof section is provided that incrementally raises the roof or roof section in order to thusly simplify the loading of the luggage compartment. In this case, the operating element is used for activating, for example, a hydraulic, pneumatic or electric drive that raises the roof or roof section by a certain fixed distance.

After the auxiliary function "raising the roof in the luggage compartment" has been carried out, another function can be assigned to the operating element, namely the function "lowering the roof into the luggage compartment."

Depending on the position of the roof or roof section in the luggage compartment, one of the two aforementioned functions therefore is assigned to the operating element at least while the luggage compartment is open. The function "opening the luggage compartment" is only reassigned to the operating element when the luggage compartment is closed. This makes it possible to significantly simplify the loading and unloading processes, namely even if only a small cargo area is available in the luggage compartment of a convertible vehicle.

In this case, the movement of the roof or roof section realized by means of the loading implement may correspond to the beginning of the roof closing movement such that at least the guide element for the movement of the roof or roof section can be eliminated and the conventionally guided movement required for closing the roof is carried out, but interrupted after a few centimeters.

The operating element may be conveniently realized in the form of a touch contact that, however, needs to have a robust construction because it is normally arranged on the outside of the vehicle. In any case, the embodiments of the invention make it possible to eliminate an additional switch or an additional operating element because the control or electronics assign different functions to the same operating element depending on the opening status of the luggage compartment. This is particularly advantageous because switches of this type are relatively complicated and expensive due to the strict requirements with respect to the resistance to environmental influences.

The operating element may also be realized in the form of a contact switch. This means that the switch does not require a mechanical actuation, but rather can be switched by simply touching the switch. In addition, the operating element may be realized in the form of a lock that can be actuated by means of a key, wherein the lock is connected to a single electric switch that carries out the different switching functions. Another switch is not required in the lock.

The operating element may be advantageously arranged underneath or adjacent to the cargo opening on the stationary part of the vehicle. This provides the advantage that the operating element remains in a fixed position and therefore can also be easily located when the luggage compartment is open.

However, it may also be advantageous to arrange the operating element on the movable element of the vehicle that closes the cargo opening. Such movable elements are normally realized in the form of a rear lid that pivots upward when the luggage compartment is opened. Due to this measure, the operating element can be easily recognized at the eye level of a person and actuated while the luggage compartment is open.

BRIEF DESCRIPTION OF THE DRAWINGS

The present invention will hereinafter be described in conjunction with the following drawing figures, wherein like numerals denote like elements, and FIG. 1 schematically shows a vehicle with a retracting roof that is situated in its luggage compartment; and FIG. 2 schematically shows a control device with the operating element.

DETAILED DESCRIPTION

Figure 1:
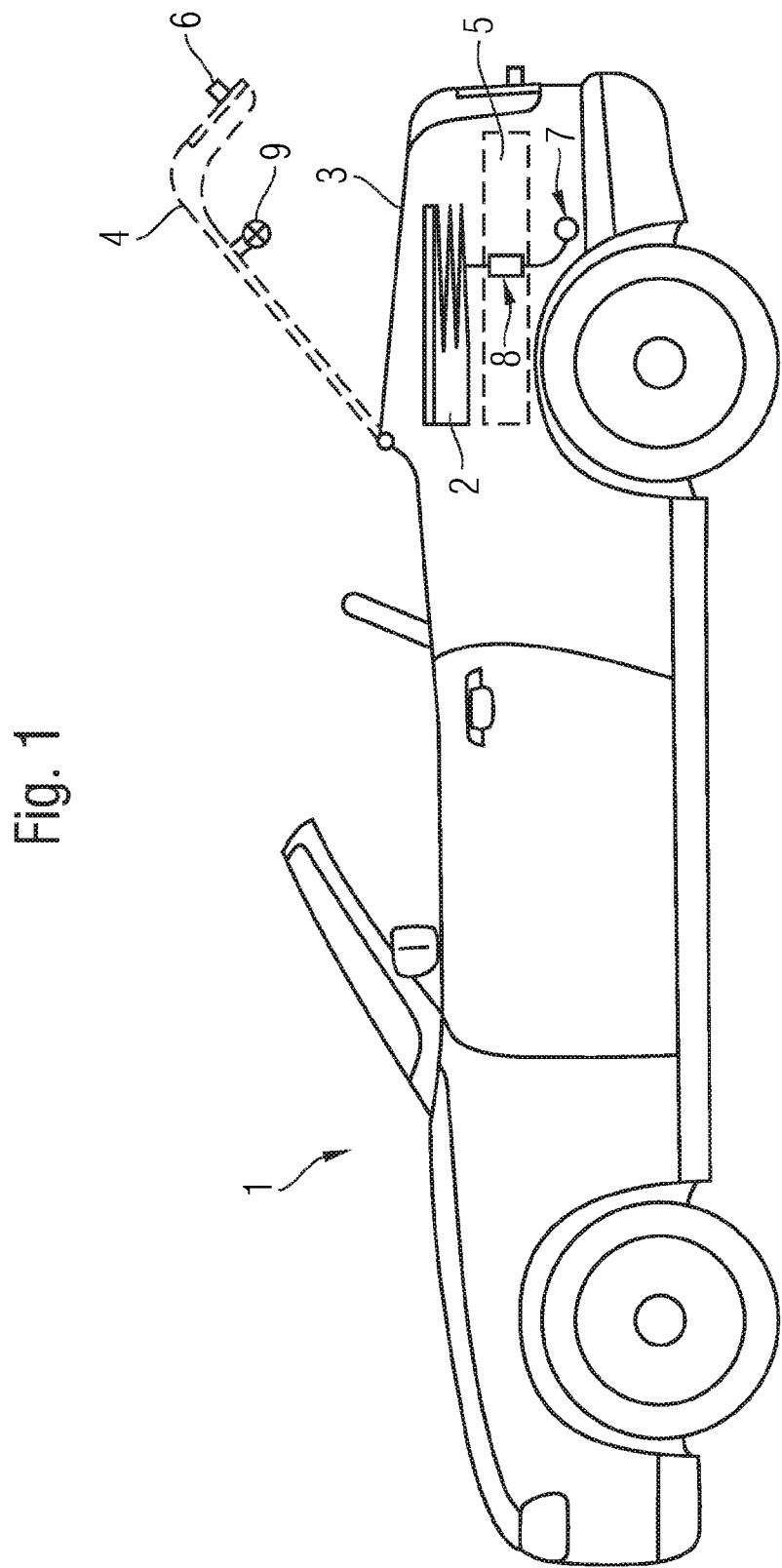

The following detailed description is merely exemplary in nature and is not intended to limit application and uses. Furthermore, there is no intention to be bound by any theory presented in the preceding summary and background or the following detailed description.

FIG. 1 shows a vehicle 1 that is realized in the form of a convertible vehicle with a roof 2 that can be lowered. The roof 2 is illustrated in the retracted state, in which it is accommodated within the luggage compartment 3.

The luggage compartment 3 is closed with a rear lid 4 that is illustrated in the closed state and (with broken lines) in the open state, in which it is pivoted upward.

The actual cargo area 5 of the luggage compartment 3 is illustrated with broken lines and partially lies underneath the retracted roof 2 within the luggage compartment 3.

The rear lid 4 features a switch 6 that is realized in the form of a touch contact, wherein the closed rear lid is unlocked by means of a single actuation of the touch contact such that the rear lid 4 can be pivoted upward.

Once the rear lid 4 is pivoted upward, the switch 6 that represents the inventive operating element is assigned the function of actuating a drive 7 for a lifting mechanism 8 of the retracted roof 2. This lifting mechanism 8 makes it possible to raise the roof 2 in the form of a pure lifting movement or an upward pivoting movement, namely to such a degree that the access to the cargo area 5 is improved and the loading process is simplified while the rear lid 8 is open.

The cargo area 5 may simply consist of the section of the luggage compartment 3 that is situated underneath the retracted roof or be separated from the remainder of the luggage compartment 3 by an inserted shell. In this case, a cover may also be provided above the shell or the cover may be formed by the retracted roof 2.

After the retracted roof 2 has been raised and the cargo area 5 has been loaded, another actuation of the switch 6 makes it possible to actuate the lifting mechanism 8 in the opposite direction such that the roof 2 is lowered on the cargo area 5. Subsequently, the rear lid 4 can be easily closed again.

As an alternative, a light bulb 9 that represents the interior illumination of the luggage compartment 3 is symbolically illustrated on the inner side of the rear lid 4. In this alternative utilization of the switch 6, said switch is assigned the function of switching on the illumination of the luggage compartment 3 that is symbolized by the light bulb 9 after the rear lid 4 is opened. The illumination can then be automatically switched off again when the rear lid 4 is closed. The illumination 9 may be provided alternatively or additionally to a luggage compartment illumination that is automatically switched on when the rear lid 4 is opened.

FIG. 2 shows the control device for the switch 6 and the corresponding modules of the vehicle. The switch 6 is shown with part of the rear lid 4 and can be actuated by exerting pressure with a finger such that it delivers a signal to the control 10. If the switch was not yet actuated prior thereto, the control initially delivers a signal to the locking mechanism 11 of the rear lid such that the rear lid is unlocked and can be opened. Information on the unlocking of the rear lid is simultaneously stored in a memory area 12 of the control 10.

A second actuation of the switch 6 once again results in the delivery of a signal to the control 10 that subsequently activates the lifting mechanism 13 for raising the roof in the luggage compartment after querying the information that indicates if the rear lid is already unlocked in the memory 12.

Information indicating that the roof was slightly raised in the luggage compartment is stored in the memory area 12.

A third actuation of the switch 6 once again results in the delivery of a signal to the control 10 that subsequently delivers a signal to the module responsible for lowering the lifting device, namely with consideration of the information indicating that the roof already was slightly raised.

After the roof is lowered, the rear lid can be closed again.

As an alternative to storing the information indicating that the rear lid was already unlocked in the control 10, it would also be possible to monitor the opening status of the rear lid with the aid of a sensor 15 and to thusly enable the sensor to assign the functions of raising and lowering the roof within the luggage compartment to the switch.

At least one advantage of the embodiments of the invention can be seen in that only one simple touch contact switch 6 with a single switching function is actually required such that the costs are significantly reduced because the corresponding switch needs to be realized extremely robust and resistant to environmental influences. It needs to withstand significant temperature fluctuations, the effects of water and humidity fluctuations as well as concussions over a period of several years without functional defects. According to the invention, only one switch of this type is required despite the different functions to be switched.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A vehicle featuring a luggage compartment with a cargo opening, comprising:
    a lid having a closed configuration wherein the lid closes the cargo opening and having an open configuration wherein the lid is raised from the cargo opening;
    a lid locking mechanism connected to the lid and configured to selectively lock the lid in the closed configuration and to selectively unlock the lid for movement to the open configuration;
    a roof having a retracted configuration wherein the roof is located in the luggage compartment;
    a roof lifting mechanism connected to the roof and configured to selectively raise the roof from the retracted configuration and to selectively lower the roof into the retracted configuration;
    a switch connected to the lid locking mechanism and to the roof lifting mechanism, wherein the switch has a single switching function to transmit a single signal; and
    a control in communication with the switch to receive the single signal, wherein the control assigns the single signal to the lid locking mechanism to unlock the lid when the lid is in the closed configuration, and wherein, when the lid is unlocked, the control assigns the single signal to the roof lifting mechanism to raise the roof from the retracted configuration.

2. The vehicle according to claim 1, wherein the control is in communication with the switch, the lid locking mechanism and the roof lifting mechanism.

3. The vehicle according to claim 2, further comprising a sensor in communication with the control, wherein the sensor is configured to monitor the configuration of the lid, and wherein the sensor is configured to communicate the configuration of the lid to the control when the switch receives the single signal.

4. The vehicle according to claim 1, further comprising an illumination element configured to illuminate the luggage compartment, wherein, when the lid is unlocked and the roof is raised, the control assigns the single signal to the illumination device to illuminate the luggage compartment.

5. The vehicle according to claim 1, further comprising an illumination element configured to illuminate vehicle surroundings, wherein, when the lid is unlocked and the roof is raised, the control assigns the single signal to the illumination device to illuminate the vehicle surroundings.

6. The vehicle according to claim 1, further comprising a loading mechanism connected to the luggage compartment and configured to selectively raise the luggage compartment and to selectively lower the luggage compartment, wherein, when the lid is unlocked and the roof is raised, the control assigns the single signal to the loading mechanism to raise the luggage compartment.

7. The vehicle according to claim 6, wherein the loading mechanism comprises a device for unlocking a spare tire located in the luggage compartment.

8. The vehicle according to claim 7, wherein the loading mechanism comprises a device for unlocking a folding back seat.

9. The vehicle according to claim 8, wherein the loading mechanism comprises the roof lifting mechanism.

10. The vehicle according to claim 9, wherein the loading mechanism raises the at least part of the roof a certain distance.

11. The vehicle according to claim 9, wherein a movement of the roof realized by the loading mechanism corresponds to the beginning of a closing movement of the roof.

12. The vehicle according to claim 1, wherein the switch comprises a touch contact.

13. The vehicle according to claim 1, wherein the switch comprises a contact switch.

14. The vehicle according to claim 1, wherein the switch is integrated into a lock that can be actuated with a key.

15. The vehicle according to claim 1, wherein the switch is arranged underneath the cargo opening on a stationary part of the vehicle.

16. The vehicle according to one of claim 1, wherein the switch is arranged on a movable element of the vehicle that closes the cargo opening.

17. The vehicle according to claim 16, wherein the switch is arranged on the lid.

18. A vehicle comprising:
- a luggage compartment formed with a cargo opening selectively closed with a lid;
- a lid locking mechanism connected to the lid and configured to selectively lock the lid in a closed configuration and to selectively unlock the lid for movement to an open configuration;
- a loading mechanism connected to the luggage compartment and configured to selectively raise the luggage compartment and to selectively lower the luggage compartment;
- a switch configured to transmit a single signal upon actuation; and
- a control in communication with the switch to receive the single signal, wherein the control assigns the single signal to the lid locking mechanism to unlock the lid upon a first actuation of the switch; and wherein the control assigns the single signal to the loading mechanism to raise the luggage compartment upon a second actuation of the switch.

19. The vehicle according to claim 18, further comprising a roof retracted into the luggage compartment, wherein the loading mechanism includes a roof lifting mechanism connected to the roof and configured to selectively raise the roof from a retracted configuration and to selectively lower the roof into the retracted configuration.

20. The vehicle according to claim 19, wherein the loading mechanism comprises a device for unlocking a spare tire located in the luggage compartment and a device for unlocking a folding back seat.

* * * * *